Dec. 25, 1945.  R. H. HILL  2,391,702
SERVO MOTOR
Filed June 2, 1943  4 Sheets-Sheet 1

Inventor
Robert H. Hill
by Spencer Hardman & Fehr
his attorneys

Dec. 25, 1945. R. H. HILL 2,391,702
SERVO MOTOR
Filed June 2, 1943 4 Sheets-Sheet 2
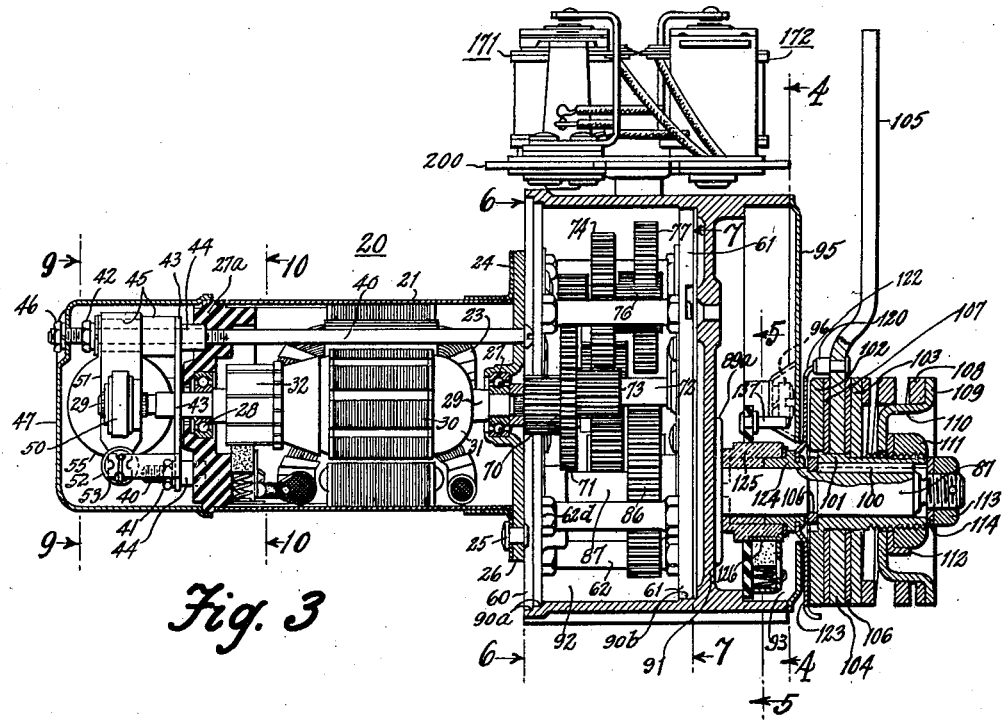
Fig. 3
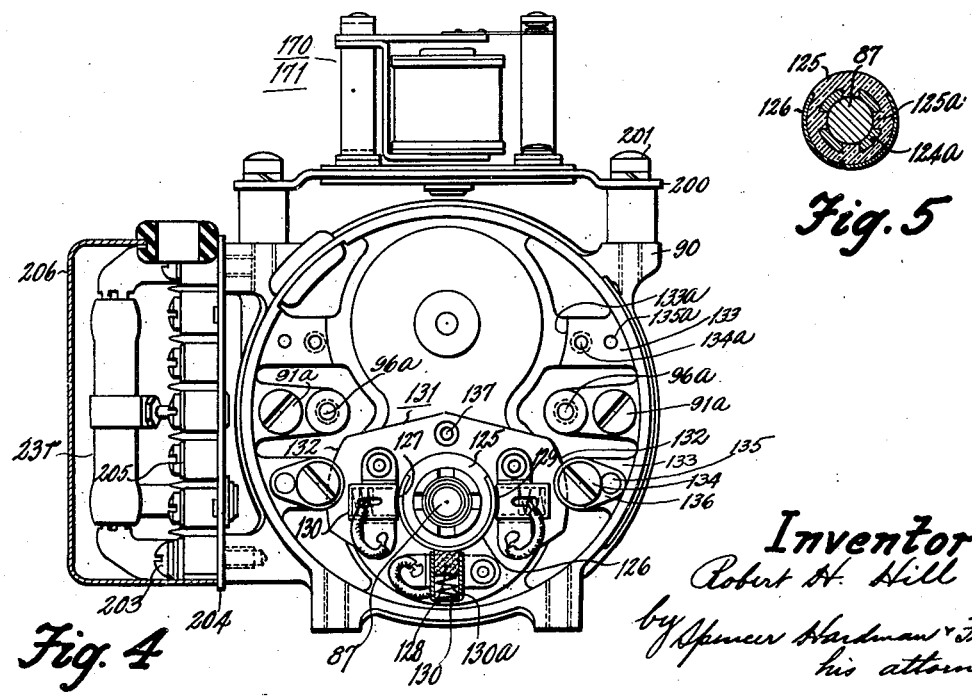
Fig. 4
Fig. 5
Inventor
Robert H. Hill
by Spencer Hardman & Fehr
his attorneys Dec. 25, 1945.    R. H. HILL    2,391,702
SERVO MOTOR
Filed June 2, 1943    4 Sheets-Sheet 3

Inventor
Robert H. Hill
by Spencer Hardman & Fehr
his attorneys

Dec. 25, 1945.   R. H. HILL   2,391,702
SERVO MOTOR
Filed June 2, 1943   4 Sheets-Sheet 4

Inventor
Robert H. Hill
by Spencer Hardman Fehr
his attorneys

Patented Dec. 25, 1945

2,391,702

UNITED STATES PATENT OFFICE 2,391,702

SERVOMOTOR

Robert H. Hill, Detroit, Mich., assignor to General Motors Corporation, Detroit, Mich., a corporation of Delaware Application June 2, 1943, Serial No. 489,397

6 Claims. (Cl. 192—142)

This invention relates to electric servo motors for use in systems of electrical control.

It is an object of this invention to provide a servo motor unit which is durable and compact and light in weight and which includes an operating arm connectible with an apparatus to be controlled, a reversible electric motor and speed reducing gearing driven by the motor and connected with the operating arm. In one form of the invention, there is a friction clutch connecting the arm with the gearing, and there are limit switches connected directly with the arm. This provides for maintaining a fixed relation between the operating arm and the switches, this relation remaining undisturbed in case it is desired to take over control of the operating arm by manual means.

Further objects and advantages of the present invention will be apparent from the following description reference being had to the accompanying drawings wherein a preferred embodiment of the present invention is clearly shown.

In the drawings:

Fig. 3 is a sectional view on line 3—3 of Fig. 1.

Fig. 4 is a sectional view on line 4—4 of Fig. 3.

Fig. 5 is a sectional view on line 5—5 of Fig. 3.

Figures 9, 10:
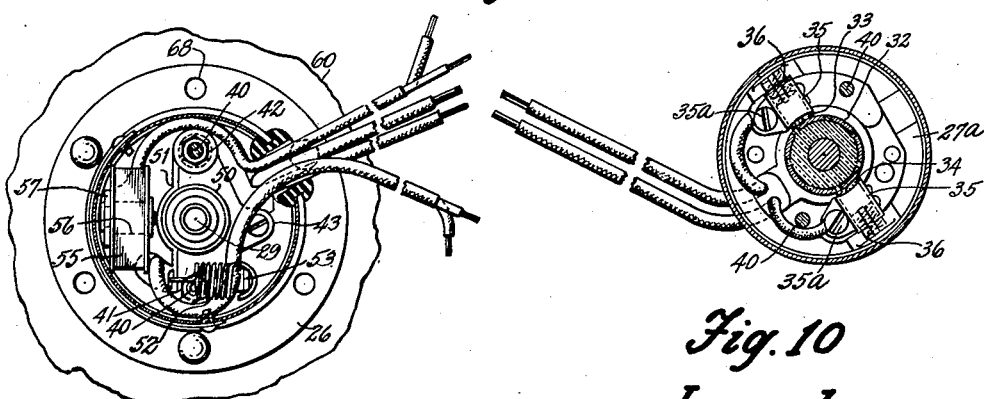
Fig. 9 is a sectional view on line 9—9 of Fig. 3.
Fig. 10 is a sectional view on line 10—10 of Fig. 3.

Referring to Fig. 3, the electric motor 20 comprises a metal shell 21 supporting a laminated field frame 22 carrying field windings 23. Shell 21 carries a flange 24 attached by rivets 25 to an end plate 26 carrying a ball bearing 27. Shell 21 supports a nonconducting block 27a carrying a ball bearing 28. Bearings 27 and 28 support an armature shaft 29 carrying a core 30, windings 31 and the commutator 32. Referring to Fig. 10, commutator 32 engages by brushes 33 and 34 guided by metal boxes 35 attached by screws 35a to the block 27a. Spring 36 urges the brushes against the commutator.

The shell 21, plate 24, and block 27a are maintained in assembled relation by thru bolts 40 cooperating with nuts 41 and 42. Nut 41 serves also to retain a plate 43 located against the sleeve 44 which is located against the block 27a and is received by a recess therein. Nut 42 on the upper thru bolt 40 (Fig. 3) retains a hub 45 and a second spacer sleeve 44 against the plate 43. A nut 46 cooperates with the upper thru bolt 40 to retain a cover 47 for a magnetically controlled brake.

Referring to Fig. 9, the brake comprises a brake disc 50 attached to shaft 29 and a brake shoe 51 having its fixed end portion secured to the hub 45. A spring 52, connecting the free end portion of the shoe 51 with a lug 53 integral with plate 43, urges the shoe 51 against the brake disc 50. The shoe 51 is magnetizable and provides the armature of an electromagnet comprising a coil 55 surrounding a core 56 attached to an ear 57 integral with plate 43. When the motor is connected with a current source, the coil 55 is energized and causes the brake shoe 51 to be attracted away from the brake disc 50.

Figure 2:
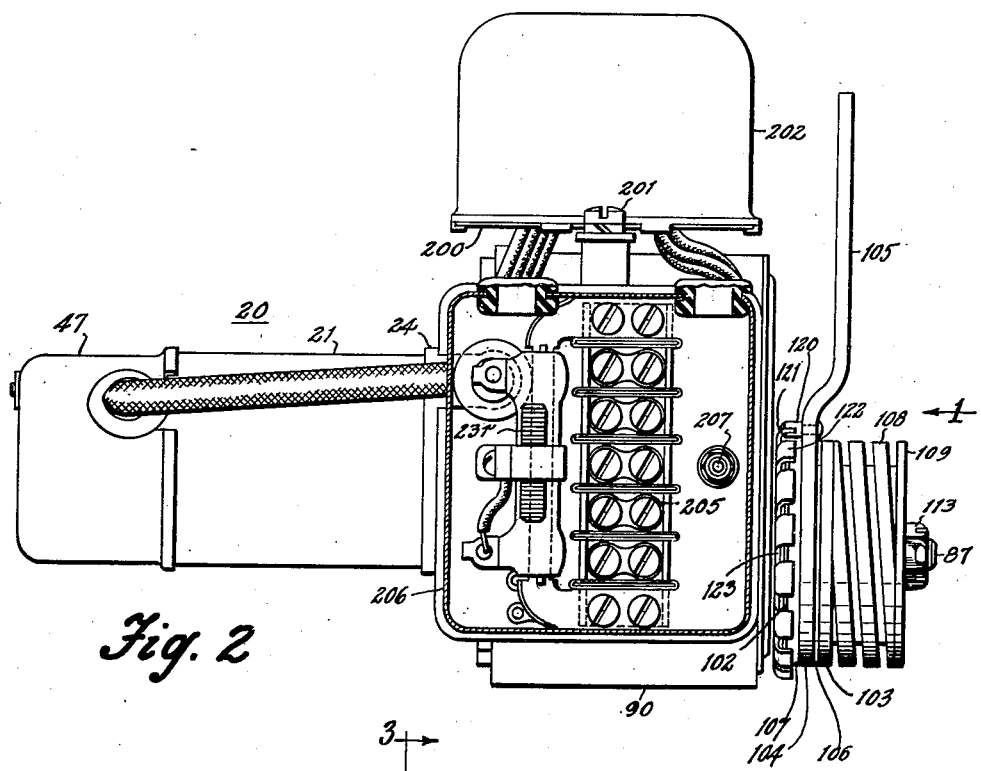
Fig. 2 is a view taken in the direction of the arrow 2 of Fig. 1, the gear box cover being shown in section.
Figure 1:
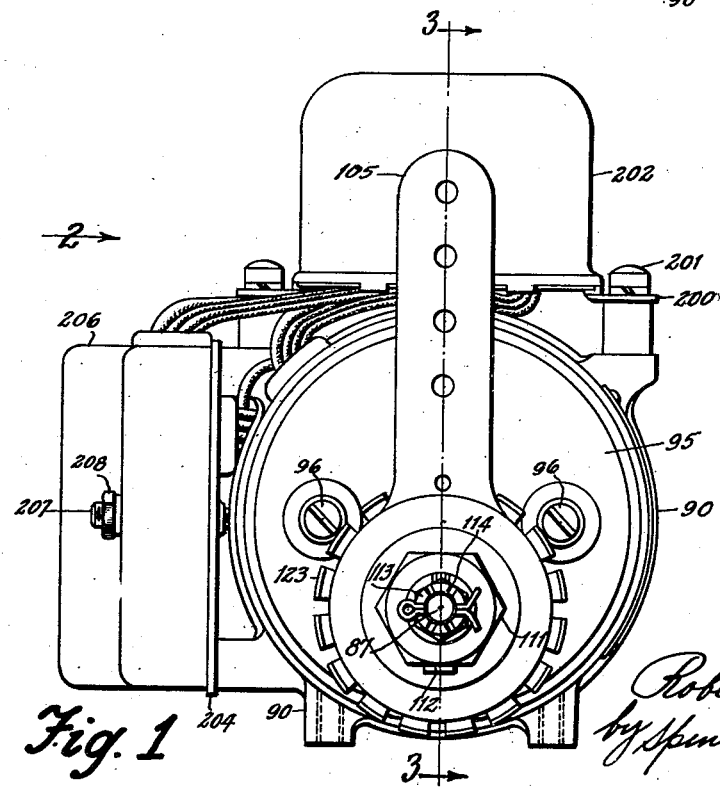
Fig. 1 is a front view of the unit embodying the present invention, this view being taken in the direction of the arrow 1 of Fig. 2.
Figures 6, 7:
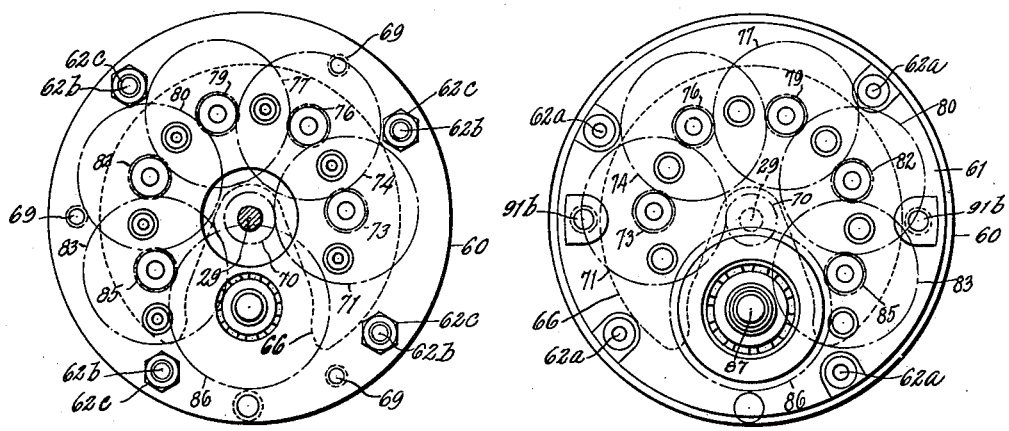
Fig. 6 is a left side view of the speed reducer subassembly and is taken substantially on the line 6—6 Fig. 3.
Fig. 7 is a right side view of the speed reducer assembly and is taken substantially on the line 7—7 of Fig. 3.
Figure 8:
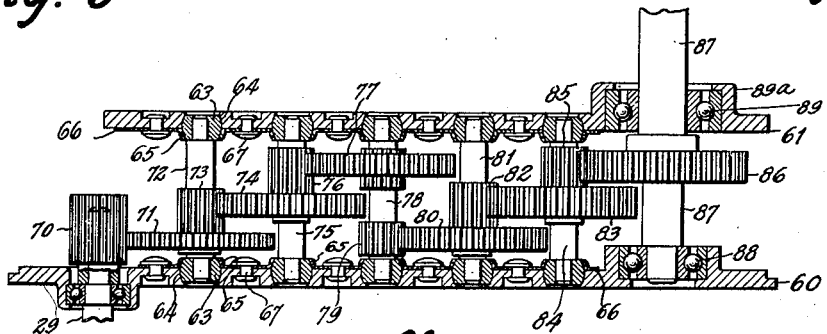
Fig. 8 is a sectional view of the speed reducing gearing, the sections being taken on the axes of the shaft bearings.

The gear reduction unit is shown in Figs. 6, 7 and 8. It comprises parallel bearing supporting plates 60 and 61 which are maintained in spaced relation by four spacing studs 62 (Fig. 3) having their left ends attached at 62a to the plate 61 and having their right ends 62b threaded and passed thru holes in the plate 60. Nuts 62c cooperate with the threaded ends 62b to hold the plate 60 against the shoulders 62d provided by the studs 62. The plates 60 and 61 support five pairs of aligned bearings 63 having spherical outer surfaces received by spherically formed recesses 64 in the plates 60 and 61 and by spherical formed flanges 65 provided by retainer plates 66 attached by rivets 67 to the plates 60 and 61.

The end plate 26 of the electric motor 20 is attached to the plate 60 by screws 68 (Fig. 9) received by tapped holes 69 (Fig. 6) in the plate 60. Motor armature shaft 29 drives a pinion 70 meshing with a gear 71 connected with shaft 72 providing a pinion 73 meshing with a gear 74 fixed to a shaft 75 providing a pinion 76 meshing with a gear 77 fixed to a shaft 78 providing a pinion 79 meshing with a gear 80 connected with a shaft 81 providing a pinion 82 meshing with a gear 82 connected with a shaft 84 providing a pinion 85 meshing with a gear 86 fixed to a shaft 87 supported by ball bearings 88 and 89 provided, respectively, by the plates 60 and 61.

Figure 12:
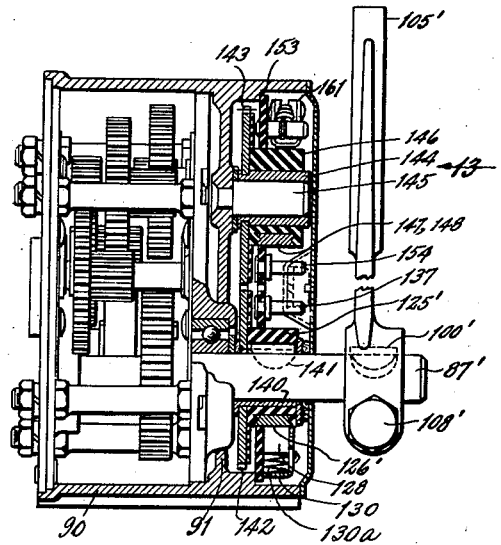
Fig. 12 is a sectional view taken generally on the line 12—12 of Fig. 11 and omits the friction clutch shown in Fig. 3.
Figure 11:
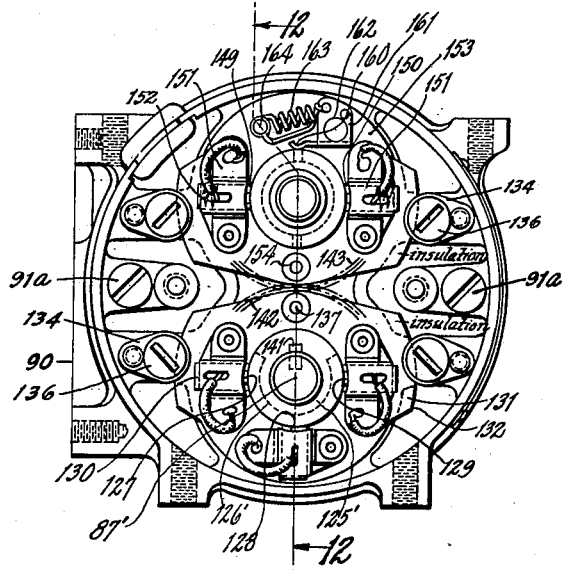
Fig. 11 is a view corresponding to Fig. 4 showing a modification of the unit shown in Figs. 3 and 4. This modification includes a centering switch as well as a limit switch, the form shown in Fig. 4 providing only the limit switch.

Referring to Fig. 3, a housing 90, which is generally circular in formation as shown in Fig. 4, is provided with a partition wall 91 dividing the interior of the housing 90 into a compartment 92 for receiving the speed reducing gearing unit and a compartment 93 for receiving limit switches as shown in Fig. 4 or to receive limit switches and a centering switch as shown in Fig. 11. The housing 90 is counterbored at 90a (Fig. 3) to receive the plate 60, and is counterbored at 90b to receive the plate 61. Screws 91a (Fig. 4) extend through the partition 91 and are threaded into tapped holes 91b in plate 61 (Fig. 7). The tightening of the screws 91a causes plate 60 to be drawn against the annular ledges of the counterbore 90a. The boss 89a (Fig. 8) surrounding the ball bearing 89 extends thru a hole in the partition 91 as shown in Fig. 12. The shaft 87 extends thru the chamber 93 and thru an opening in a cover plate 95 attached by screws 96 to the partition 91. Fig. 4 shows threaded holes 96a for receiving the screws 96.

Exterior to the cover 95 the shaft 87 is provided with a key 100 connecting shaft 87 with a sleeve 101 which provides the hub of a clutch disc 102. A second clutch disc 103 is splined to the hub 101. Between the two discs 102 and 103, there is located the hub 104 of a lever 105 having clutch facings 106 and 107 attached thereto. Pressure between the clutch parts is applied by a spring 108 located between the disc 103 and the flange 109 of a cupped washer 110 retained by a nut 111 and a lock washer 112 cooperating with the sleeve 101. Sleeve 101 is retained on shaft 87 by a nut 113 threadedly engaging the shaft and retained by a lock washer 114. The spring 108 is so adjusted as to provide a friction clutch connection between the shaft 87 and the arm 105 such as to transmit the torque required to operate an apparatus connected with the arm 105. However the friction between the clutch parts should not be so great as to prevent operation of the lever 105 manually.

Lever 105 carries a pin 120 which is received selectively by one of several notches 121 in the flange 122 of a disc 123 (Fig. 3) attached to a sleeve 124 loosely journalled on shaft 87 and splinedly connected with a nonconducting hub 125. In Fig. 5 the splines of sleeve 124 are shown at 124a and the splines of hub 125 at 125a. This spline connection provides for connecting the hub 124 with the hub 125 after the cover 95 has been attached.

Referring also to Fig. 4, the hub 125 carries the metallic segment 126 of a limit switch which includes brushes 127, 128 and 129 guided by boxes 130 attached to a nonconducting plate 131 which is centrally apertured to clear the hub 125. Springs 130a urge these brushes against the segment 126. Plate 131 has arcuate edges 132 received by arcuate shoulders 133a of bosses 133 provided by partition 91. In Fig. 4, the upper bosses 133 show the arcuate shoulders 133a. These shoulders are defined by an arc coaxial with shaft 87. By moving a handle 137 attached thereto, the plate 131 can be rotated around the shaft 87 to adjust the brushes 127, 128 and 129 relative to the segment 126. The plate 131 is retained in adjusted position by tightening screws 134 threaded into holes 134a in bosses 133 to force plates 136 against the plate 131. Plates 136 are prevented from rotating by the studs 135 attached thereto which are received by holes 135a in the bosses 133.

Figure 13:
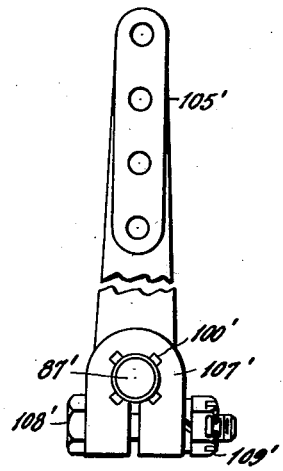
Fig. 13 is a view in the direction of arrow 13 of Fig. 12 showing only the operating arm.

In the modification shown in Figs. 11 to 13, the operating lever 105' is directly keyed at 100' to shaft 87', the friction clutch being omitted. Lever 105' has a split hub 107' which is forced against the shaft 87' by a screw 108' and a nut 109'. Shaft 87' is connected by key 141 with a sleeve 140 to which an insulated hub 125' is bonded. Hub 125' carries the segment 126' of the limit switches which are the same in construction as the form shown in Figs. 3 and 4. Sleeve 140 provides the hub of a gear 142 which drives a gear 143 having a hub 144 journalled on a stub shaft fixed to partition 91. Hub 144 is bonded to an insulating hub 146 carrying metal segments 147 and 148 engaged by brushes 149 and 150, respectively, which are supported by brush holders 151 attached to a nonconducting plate 153 and which are urged by springs 152, against the metal segments. The segments 147 and 148 are engageable with a contact 160 integral with ears 161 pivoted on a stud 162 attached to the plate 153 which is supported in the same manner as the plate 131 below. Plate 153 has an adjusting handle 154. A spring 160, connecting an ear 161 and a stud 164 fixed to plate 131, urges contact 161 toward the hub 146.

Figure 14:
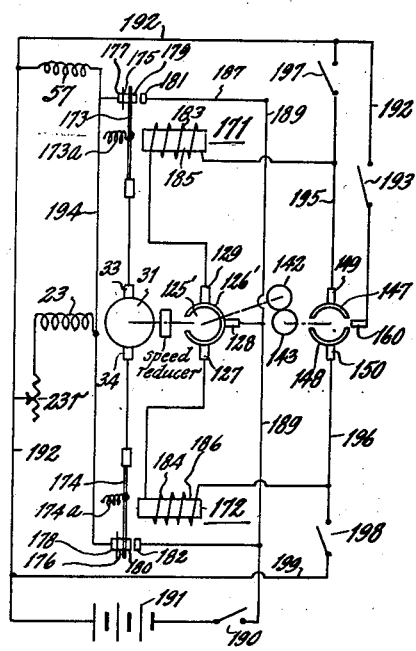
Fig. 14 is a wiring diagram showing the circuits of the motor and the limit and centering switches.

Fig. 14 is the wiring diagram for the modification shown in Figs. 11 to 13. The motor brushes 33 and 34 are connected, respectively, with armatures 173 and 174 of relays 171 and 172. Springs 173a and 174a are normally effective to urge the armatures 173 and 174, respectively, toward the left to cause contacts 175 and 176, respectively, supported by these armatures, to engage contacts 177 and 178, respectively. By magnetic attraction, the armatures 173 and 174 can move to the right to separate contacts 175 and 176, respectively, from contacts 177 and 178 and cause contacts 179 and 180 to engage contacts 181 and 182 respectively. The magnets of the relays 171 and 172 are provided, respectively, by coil 183 on a core 185 and by coil 184 on a core 186.

Wires 187 and 188 connect contacts 181 and 182, respectively, with wire 189 connectible by a switch 190 with a battery 191 connected by wire 192 with a switch 193 with centering-switch brush 160. Brake control magnet coil 57 is connected between wire 192 and a wire 194 connected with relay contacts 177 and 178. A variable resistance 23r and motor field 23 are connected between wires 192 and 194. Limit-switch brush 129 is connected with relay coil 183 connected with a wire 195 leading to centering switch brush 149. A switch 197 connects wires 192 and 195. Limit-switch brush 127 is connected with relay coil 184 connected with a wire 196 leading to centering-switch brush 150. A switch 198 connects wire 196 with a wire 199 connected with wire 192.

Switch 190 is closed before operation of the motor in either direction can take place. Switches 197, 198 and 193 are selectively operated by direct manipulation or by remote control. When switch 197 is closed, relay 171 is effective to cause current to flow through the motor armature 31 in a direction such that hub 125' rotates clockwise until the switch 197 is opened but not after segment 126' leaves the brush 129. When switch 198 is closed, relay 172 is effective to cause current to flow through the motor armature 31 in a direction such that hub 125' rotates counterclockwise until the switch 198 is opened but not after segment 126' leaves the brush 127. When switch 193 is closed, the motor operates in the direction required to bring the arm 105' back to center position. When either one of the switches 193, 197 and 198 is closed and either one of the relays 171, 172 is energized, the brake magnet coil 57, as well as the motor field 23, is energized to cause the brake shoe 51 to move away from the brake drum 50. When the relays are disconnected from the battery either by the opening of the limit switches or the centering switch or by opening any of the switches 193, 197 and 198 which had been previously closed, the relays are deenergized and likewise the magnet coil 57 whereupon the spring 52 is effective to cause the brake shoe 51 to engage the brake drum 50.

The wiring diagram of the first form of the electric servo-motor unit is the same as shown by Fig. 14, but with the centering-switch, wires 195 and 196 and switch 193 omitted. The relays 171 and 172 which are used with both forms are supported by a plate 200 attached to gear case 90 by screws 201 (Fig. 4) and are enclosed by a cover 202. Screws 203 (Fig. 4) attach to case 90 a plate 204 supporting junction blocks 205 and the resistance 23r. These parts are enclosed by a cover 206 attached to plate 204 by a stud 207 and a nut 208. Various connections shown diagrammatically in Fig. 14 are made within the enclosure provided by plate 204 and cover 206.

While the embodiments of the present invention as herein disclosed, constitute preferred forms, it is to be understood that other forms might be adopted, all coming within the scope of the claims which follow.

What is claimed is as follows:

1. An electric servo-motor unit comprising a frame providing a gear housing open at one end, said frame having a wall closing the other end of the gear housing, a subassembly comprising a train of speed reducing gears and spaced parallel plates by which the gears are supported, one of the plates being attached to said wall of the frame and the other plate providing a cover for the gear compartment of said housing and having an opening providing access to the first gear of the speed reducing train, a sub-assembly comprising an electric motor having a frame and an armature shaft extending from the frame and a gear attached to the armature shaft, means for so attaching the motor frame to the second mentioned plate of the gear sub-assembly that the gear on the motor armature shaft meshes wtih the first gear of the gear train and the motor frame covers the hole in the second mentioned plate, and an operating member driven by the gearing.

2. In a device of the character described, the combination with a cup-shaped housing having an opening in its bottom wall; of a unitary sub-assembly adapted to be secured to said housing and comprising two discs rigidly held together in parallel spaced relation and adapted to be telescopically received by the cup-shaped housing so that the one disc rests upon the bottom wall of said housing and the other disc forms a cover plate for the open end of the cup-shaped housing, a plurality of shafts journalled in and between said discs and having cooperating gears forming a speed reducing gear train, one of said shafts extending through the opening in the bottom wall of the housing, an electric motor secured to the cover disc and having its shaft operatively connected with a shaft of the speed reducing gearing to drive it; and means for securing the two discs to said housing.

3. An electric servo motor unit comprising a tubular frame having an apertured partition wall intermediate its open ends, said wall forming two compartments in the frame; a unitary sub-assembly comprising an electric motor secured to one of two spaced, parallel plates between which a train of speed reducing gears, driven by the motor, are supported, the plate to which the motor is secured fitting into the open end of the frame to form a cover therefor and the other plate resting upon and secured to the partition to fasten the sub-assembly to the frame; a shaft driven by the speed reducing gearing, extending through the aperture in the partition into the other compartment adjacent the one containing the gearing; a cover for the said other compartment, said cover having an opening through which the shaft extends; a switch mechanism in the said other compartment operative by the shaft; and an operated lever secured to the shaft outside the cover for said other compartment.

4. An electric servo motor unit comprising a frame providing a gear housing open at one end, said frame having a wall closing the other end of the gear housing and having a hole therein; a unitary sub-assembly adapted to be assembled with the housing and comprising a speed reducing gear train and an electric motor for driving the gear train and an operating shaft driven by the gear train and extending through said hole, the unitary sub-assembly having means cooperating with the frame adjacent its open end to provide a cover therefor when the gear train is located within the housing; and means for securing the sub-assembly to the wall of the frame.

5. An electric servo motor unit comprising a unitary sub-assembly having spaced, coaxially aligned discs; an electric motor attached to one of said discs; a train of speed reducing gearing supported between said discs and operatively connected to the electric motor; shafts carrying said gearing and holding the discs in spaced relation; a frame having an open end into which the discs are inserted to house the gearing, said open end having an annular recess providing a ledge upon which the motor supporting disc seats, said disc forming a cover for the frame; an annular recess in the frame for receiving the disc in coaxial alignment with the motor supporting disc; means for securing the sub-assembly to the frame; and an operating arm driven by the gearing.

6. An electric servo motor unit comprising a tubular housing having a partition wall intermediate its open ends; a unitary sub-assembly comprising two annular, coaxial, spaced discs, shafts between said discs, certain of which support cooperating gears of a spaced reducing gear train, the others holding the discs properly spaced, an electric motor attached to the one disc and operatively connected to the gear train; coaxial, annular recesses in the open end of the housing and the partition wall, the recess in the open end receiving the motor supporting disc, the recess in the partition wall receiving the other disc; means in the partition wall for securing the seating disc of the sub-assembly thereto; a shaft extending from the gear train through an opening in the partition wall; a switch for controlling the motor, secured in the housing on the side of the partition wall opposite the gear train; means on the shaft for actuating the switch; and a lever on the shaft operated thereby.

ROBERT H. HILL.